United States Patent Office 3,464,992
Patented Sept. 2, 1969

3,464,992
15 - DEHYDRO - 6,14 - ENDOETHENO AND ENDOETHANO NORTHEBAINES AND NORORIPAVINES
Philip Arthur Mayor and David Ian Haddlesey, Hull, John William Lewis, Cottingham, and Kenneth Walter Bentley, Willerby, England, assignors to Reckitt & Sons Limited, Hull, England, a British company
No Drawing. Filed Mar. 25, 1968, Ser. No. 715,497
Claims priority, application Great Britain, Mar. 31, 1967, 14,755/67
Int. Cl. C07d *43/28;* A61k *27/00*
U.S. Cl. 260—285          8 Claims

ABSTRACT OF THE DISCLOSURE

The invention relates to novel derivatives of thebaine and oripavine of the formula:

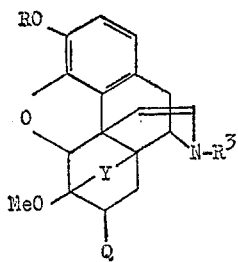

and salts of the compounds of the said formula, wherein Y, Q, R and $R^3$ are hereinafter specified radicals, are prepared by the dehydrogenation of compounds of the formula:

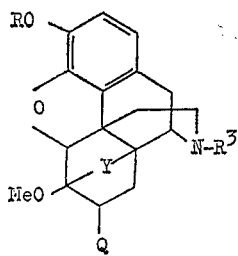

The novel derivatives of the invention in which Q is

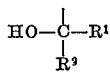

wherein $R^1$ and $R^2$ are each hereinafter specified radicals, and their salts with pharmaceutically acceptable acids are therapeutically useful. The invention also includes pharmaceutical compositions comprising the novel compound or a pharmaceutically acceptable salt thereof, and a carrier, therefor, which may be in unit dosage form.

---

This invention relates to novel derivatives of thebaine and oripavine, to their salts, and to processes for their preparation.

According to the present invention there are provided compounds of the following formula, and salts of compounds of the said formula:

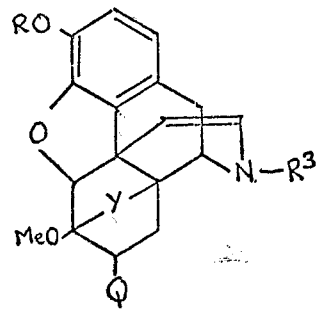

wherein Y is etheno (—CH=CH—) or ethano
(—CH$_2$—CH$_2$—)

Q is one of the radicals

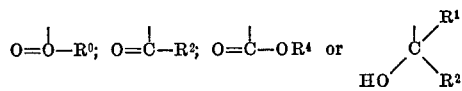

$R^0$ is hydrogen, phenyl or tolyl;
R is a methyl group or hydrogen;
$R^1$ is hydrogen, an alkyl or alkenyl group of up to 3 carbon atoms, a phenyl or a tolyl group;
$R^2$ is cycloalkyl group of 5 to 7 carbon atoms, an alkyl or alkenyl group of up to 8 carbon atoms, a benzyl or a phenethyl group;
$R^3$ is an alkyl group of up to 5 carbon atoms, a cycloalkyl methyl group of 4 to 6 carbon atoms, an allyl, methylallyl, dimethylallyl or crotyl group;
$R^4$ is an alkyl group of up to 5 carbon atoms;

The organic bases of the invention form addition salts with acids. Since the bases of the invention contain the enamine grouping the salts of these bases are iminium salts, for example the perchloric acid salts have the formula:

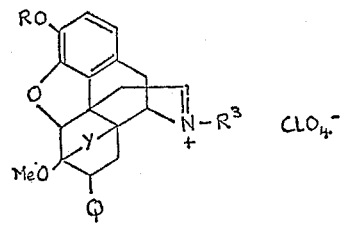

wherein R, $R^3$, Q and Y have the above meanings and Me is methyl.

It is to be understood that the invention also includes these iminium salts.

The novel bases of the invention may be prepared by the dehydrogenation of compounds of the Formula II;

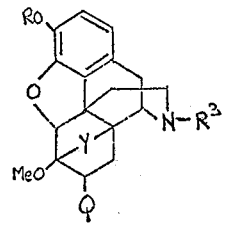

wherein R, R³, Q and Y are as defined hereinbefore. The compounds of Formula II in which Q is

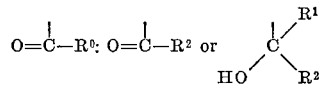

and Y is the etheno group (—CH=CH—) are described in British Patents Nos. 902,659, 925,723, 937,214, 969,263, or may be prepared by the methods described in these patents. The compounds of Formula II in which Q represents

and Y is the etheno group (—CH=CH—) may be prepared by the Diels Alder reaction of thebaine with an acrylic acid ester of the formula $CH_2=CHCOOR^4$. The compounds of Formula II in which Y is the ethano group (—CH₂—CH₂—) may be prepared from the corresponding compounds in which Y is the etheno group (—CH=CH—)

which have been prepared by the methods described, by hydrogenation in the presence of a hydrogenation catalyst. The dehydrogenation of compounds of general Formula II is most conveniently accomplished by heating the compound in aqueous acetic acid with mercuric oxide or acetate preferably at reflux for ¼ to 2½ hours.

The bases of Formula I in which

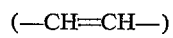

may also be prearde from the bases of Formula I in which

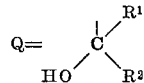

Thus the alcohols may be prepared from the ketones of Formula I in which

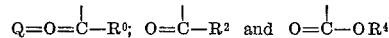

by reaction with respectively an organo metallic compound for example a Grignard reagent R²MgX or an alkyl lithium LiR²; or with an organo metallic compound for example a Grignard reagent R⁰MgX or R¹MgX or an alkyl lithium LiR⁰ or LiR¹, where X is a halogen atom.

The tertiary alcohols in the special case where R¹=R² may be prepared from the esters of Formula I in which

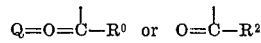

by reaction with an organometallic compound such as a Grignard reagent R¹MgX or an alkyl lithium R¹Li. The secondary alcohols in which

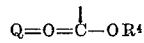

may be prepared from the ketones of Formula 1 in which

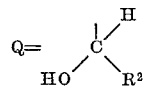

by reduction with, for example, lithium aluminum hydride or aluminum isopropoxide.

The invention is further illustrated by the following examples:

Example 1.—7-acetyl-15-dehydro-6,14-endoethenotetrahydrothebaine

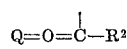

Mercuric oxide (66 g.) was dissolved in a mixture of acetic acid (96 ml.) and water (1200 ml.) 7-acetyl-6,14-endoethenotetrahydrothebaine (21.6 g.) was added and the solution boiled under reflux for 20 minutes, during which time mercurous acetate precipitated. The cooled solution was saturated with hydrogen sulphide and the precipitate removed by centrifugation and filtration. The solid precipitated by neutralization of the filtrate with potassium carbonate was collected, washed well with water and crystallized from ethanol when the dehydro-compound was obtained as prisms (11.2 g.), M.P. 104–109° C.

*Analysis.*—Calcd. for $C_{23}H_{25}NO_4$: C, 72.8; H, 6.6. Found: C, 72.7; H, 6.8%.

The perchlorate, prepared by dissolving the base in dilute acetic acid and adding aqueous sodium perchlorate solution, crystallized from methanol as needles, M.P. 189–191° C.

*Analysis.*—Calcd. for $C_{23}H_{25}NO_4 \cdot HClO_4$: C, 57.6; H, 5.5; Cl, 7.4. Found: C, 57.8; H, 5.7; Cl, 7.65%.

Example 2.—15-dehydro-6,14-endoetheno-7-(1-hydroxy-1-methylethyl)tetrahydrothebaine

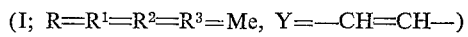

(a) Mercuric oxide (33 g.) was dissolved in a mixture of acetic acid (48 ml.) and water (600 ml.) 6,14-endoetheno-7-(1-hydroxy-1-methylethyl) tetrahydrothebaine (12 g.) was added and the solution was boiled under reflux for 1 hour. The cooled solution was saturated with hydrogen sulphide and the precipitate removed by centrifugation and filtration. The filtrate was neutralized with potassium carbonate and the precipitate collected and washed well with water. When the precipitate was crystallized from aqueous ethanol, the dehydro-compound was obtained as prisms (7.2 g.), M.P. 153–155° C.

*Analysis.*—Calcd. for $C_{24}H_{29}NO_4$: C, 72.9; H, 7.4. Found: C, 72.7; H, 6.9%.

When the base was dissolved in diluted acetic acid and an aqueous solution of sodium perchlorate was added, the perchlorate precipitated, M.P. 240–242° C. (decomp.)

*Analysis.*—Calcd. for $C_{24}H_{29}NO_4 \cdot HClO_4$: C, 58.1; H, 6.1; Cl, 7.15. Found: C, 57.6; H, 5.9; Cl, 7.5%.

(b) A solution of methyl magnesium iodide in ether (25 ml.) was prepared from magnesium (0.2 g.) and methyl iodide (1.1 ml.), 7-acetyl-15-dehydro-6,14-endoethenotetrahydrothebaine (0.5 g.) was added and the mixture boiled under reflux for 18 hours. The cooled solution was treated with ammoniacal ammonium chloride solution and extracted with ether to give material M.P. 153–155°, identical in all respects with the dehydrocompound obtained in (a) above.

Example 3.—7-carbethoxy-15-dehydro-6,14 - endoethenotetrahydrothebaine

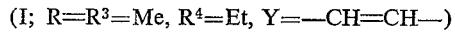

Mercuric oxide (110 g.) was dissolved in a mixture of acetic acid (220 ml.) and water (780 ml.), 7-carbethoxy-6,14-endoethenotetrahydrothebaine (50 g.) was added and the mixture boiled under reflux for 45 minutes. The cooled solution was saturated with hydrogen sulphide and the precipitate removed by centrifugation and filtration. The filtrate was basified with potassium carbonate and the solid collected, which after crystallization from ethanol gave the dehydro-compound as prisms (30 g.), M.P. 91–93° C.

*Analysis.*—Calcd. for $C_{24}H_{27}NO_5$: C, 70.4: H, 6.7. Found C, 70, O, H, 6.6%.

The following table sets out details of further compounds prepared by the method of Example 2(a). In the column headed Y, A is etheno and B is ethano.

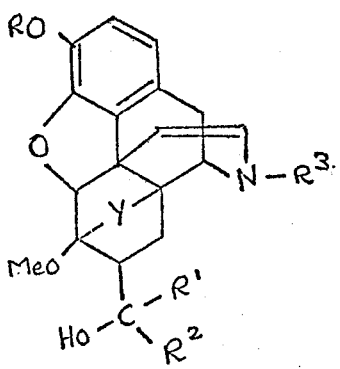

Green A.F. and Young P.A. (1951), Br. J. Pharmac. Chemother, 6, 572. Male rats weighing 60–80 g. received either saline as controls or one of a logarithmic series of doses of the drug, either subcutaneously or orally 30 and 60 min. respectively before determining pain thresholds. The animals are regarded as showing analgesia if they failed to squeal on application of a pressure greater than twice the mean pressure required to cause a vocal response in the controls. From the percentage showing analgesia at each does level the ED50 was calculated.

The antitussive activity of certain of the compounds of the present invention was measured in guinea pigs using a modified form of the apparatus described by Winter C.A. and Flataker L. (1954). J. Pharmac. exp. Ther., 112, 99.

| Ex. | R | $R^1$ | $R^2$ | $R^3$ | Y | Reflux time (hours) | Yield, percent | M.P. base, °C. | Percent found C | Percent found H | Formula | Percent calcd. C | Percent calcd. H |
|---|---|---|---|---|---|---|---|---|---|---|---|---|---|
| 4 | Me | Me | Me | Et | A | 0.5 | 40 | 170–171 | 72.9 | 7.6 | $C_{24}H_{31}NO_4$ | 72.9 | 7.4 |
| 5 | Me | Me | Et | Me | A | 1.0 | 60 | 72–75 | 73.7 | 7.9 | $C_{25}H_{31}NO_4$ | 73.3 | 7.6 |
| 6 | Me | Me | Et | $CH_2$–△ | A | 0.25 | 40 | 123–124 | 73.6 | 7.8 | $C_{28}H_{37}NO_4$ | 74.4 | 8.2 |
| 7 | Me | Me | n-Pr | Me | A | 1.0 | 55 | 192–194 | 73.6 | 8.0 | $C_{26}H_{33}NO_4$ | 73.7 | 7.9 |
| 8 | Me | Me | n-Bu | Me | A | 2.5 | 70 | 168–170 | 74.4 | 8.1 | $C_{27}H_{35}NO_4$ | 74.1 | 8.1 |
| 9 | Me | Me | n-Am | Me | A | 1.15 | 50 | 99–102 | 74.5 | 8.3 | $C_{28}H_{37}NO_4$ | 74.5 | 8.3 |
| 10 | Me | Me | ⬡ | Me | A | 0.5 | 60 | 182–185 | 73.7 | 8.0 | $C_{29}H_{39}NO_4$ | 74.8 | 8.4 |
| 11 | Me | Me | ⬡ | Me | B | 1.5 | 70 | 164–165 | 74.5 | 8.8 | $C_{29}H_{41}NO_4$ | 74.5 | 8.8 |
| 12 | Me | Me | $CH_2Ph$ | Me | A | 1.0 | 65 | 195–199 | 76.3 | 7.2 | $C_{30}H_{33}NO_4$ | 76.4 | 7.1 |
| 13 | Me | Me | $CH_2CH_2Ph$ | Me | A | 1.25 | 50 | 159–160 | 76.1 | 7.3 | $C_{31}H_{35}NO_4$ | 76.7 | 7.3 |
| 14 | H | Me | ⬡ | Me | A | 0.5 | 40 | 142–145 | 72.1 | 8.0 | $C_{28}H_{35}NO_4 \cdot H_2O$ | 71.9 | 8.0 |
| 15 | Me | Me | Me | Me | B | 1.5 | 65 | 117–118 | 72.5 | 7.7 | $C_{24}H_{31}NO_4$ | 72.5 | 7.9 |
| 16 | H | Me | Me | $CH_2$–△ | A | 0.75 | 50 | 239–240 | 73.9 | 7.4 | $C_{26}H_{31}NO_4$ | 74.1 | 7.4 |
| 17 | Me | Me | Me | $CH_2$–△ | B | 1.25 | 65 | 136–137 | 74.2 | 8.0 | $C_{27}H_{35}NO_4$ | 74.1 | 8.0 |
| 18 | H | Me | n-Pr | $CH_2CH=CH_2$ | A | 0.75 | 40 | 236–238 | 73.4 | 7.7 | $C_{27}H_{33}NO_4 \cdot \frac{1}{2}C_2H_5OH$ | 73.3 | 7.9 |

In the above table  represents cyclohexyl.

The following are further examples of compounds in accordance with the invention which may be prepared by the methods detailed above:

15 - dehydro-6,14-endoetheno-7-formyltetrahydrothebaine
15-dehydro-6,14-endoetheno-7-(1-hydroxyethyl)tetrahydrothebaine
15-dehydro-6,14-endoetheno-7-(1-hydroxy-1-phenylethyl)tetrahydrothebaine
15-dehydro-6,14 - endoetheno-7-(1-allyl-1-hydroxyethyl)-tetrahydrothebaine
N-cyclobutylmethyl-15-dehydro-6,14-endoetheno-7-(1-hydroxy-1-methylethyl)-tetrahydronorthebaine
N-dimethylallyl-15-dehydro-6,14-endoetheno-7-(1-hydroxy-1-methylethyl)-tetrahydronorthebaine The novel bases of the invention in which Q is $$HO-\underset{\underset{R^2}{|}}{\overset{\overset{R^1}{|}}{C}}-$$

and their salts with pharmaceutically acceptable acids, are useful and valuable as analgesis. In addition to this analgesic activity certain of the compounds also possess antitussive activity.

A test procedure which indicates an analgesic action similar to that of morphine is the tail-pressure method of Groups of 12–36 guinea pigs were exposed for 5 min. to a 20% citric acid aerosol. Drugs, or saline for control purposes, were given either subcutaneously or orally 30 and 60 min respectively before recording the coughs occurring in each group. The reduction in number of coughs at each does level was assessed by comparison with the controls and plotted against the logarithm of the dose given. The dose required to inhibit the number of coughs by 50% was determined.

The analgesic and anti-tussive activities of a number of the compounds which are described in the Examples are set out in the tables. For comparison the results of corresponding tests using codeine and morphine are given.

| | Analgesic, $ED_{50}$ mg./kg. | Antitussive, $ED_{50}$ mg./kg. |
|---|---|---|
| Example No.: | | |
| 8 | 75 PO | 9 |
| 9 | 60 IP | 3.8 |
| 10 | 40 PO | 0.44 |
| 12 | 82 SC | 0.29 |
|  | 4.4 PO | |
| 13 | 18 SC | ------ |
| 15 | 2.1 SC | ------ |
| Codeine | 17 SC | 30 |
| Morphine | 2.1 SC | 7.5 |

The compounds were administered orally (PO), subcutaneously (SC) or intraperitoneally (IP).

Additionally, supplementary routine tests known to those skilled in the art may be carried out to assess the importance of side actions frequently associated with morphine-like analgesics. These include such actions as onset and duration of action, development of tolerance, respiratory depression, addiction liability, relative effects by oral and parenteral administration, and inhibitory effects on the gastro-intestinal system.

When mixed with suitable excipients or diluents, the compounds of this invention can be prepared as pills, capsules, tablets, powders, solutions, suspensions and the like for unit dosage, and to simplify administration. As analgesics they will relieve pain by direct action on the nerve centres or by diminishing the conductivity of the sensory nerve fibers. As antitussives they depress the cough centre in the brain.

The enamine grouping is a reactive function, and by virtue of this reactivity the novel 15-dehydrothebaine and oripavine compounds of the present invention are also useful as intermediates in the preparation of 16-alkyl derivatives of thebaine and oripavine as is set out in greater detail in our co-pending application No. 715,498 filed concurrently. These compounds, as their iminium salts, may be reacted with organo metallic compounds e.g. Grignard reagents or alkyl lithiums with the production of 16-alkyl thebaine and oripavine compounds. These latter compounds are therapeutically useful because of their power to affect the nervous system, particularly because of their central effects such as analgesic action. Thus, the iminium salts of formula

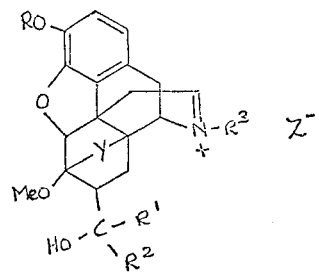

may be reacted with organo metallic compounds for example a Grignard reagent, $R^2MgX$ or an organo lithium compound $R^5Li$ to give 16-alkyl derivatives of thebaine and oripavine of the formula

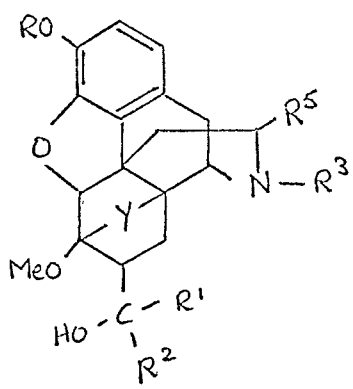

wherein $R^5$ is a phenyl or tolyl group, a cycloalkyl group of 5 to 7 carbon atoms, an alkyl or alkenyl group of up to 5 carbon atoms, a propargyl group, a benzyl or a phenethyl group.

We claim:
1. A compound of the formula:

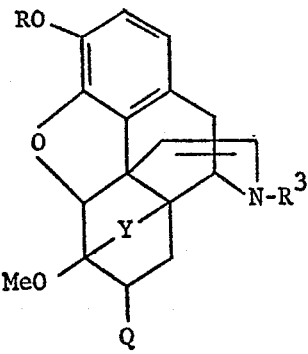

wherein
Y is etheno (—CH=CH—) or ethano
(—CH$_2$—CH$_2$—)

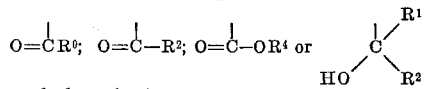

R is methyl or hydrogen;
$R^0$ is hydrogen, phenyl or tolyl;
$R^1$ is hydrogen, alkyl or alkenyl of up to 3 carbon atoms, phenyl or tolyl;
$R^2$ is cycloalkyl of 5 to 7 carbon carbon atoms, alkyl or alkenyl of up to 8 carbon atoms, benzyl or phenethyl;
$R^3$ is alkyl of up to 5 carbon atoms or cycloalkyl methyl of 4 to 6 carbon atoms; and
$R^4$ is alkyl of up to 5 carbon atoms, or a pharmaceutically acceptable salt thereof.

2. A compound of claim 1 wherein Q is

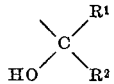

or a pharmaceutically acceptable salt thereof.

3. A compound of the formula:

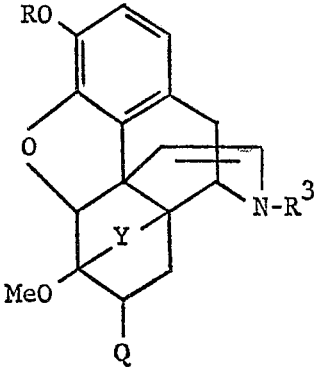

wherein
Y is etheno (—CH=CH—) or ethano
(—CH$_2$—CH$_2$—)

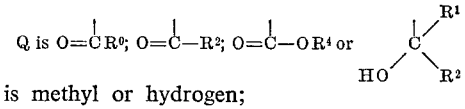

R is methyl or hydrogen;
$R^0$ is hydrogen, phenyl or tolyl;
$R^1$ is hydrogen, alkyl or alkenyl or up to 3 carbon atoms, phenyl or tolyl;
$R^2$ is cycloalkyl of 5 to 7 carbon atoms, alkyl or alkenyl of up to 8 carbon atoms, benzyl or phenethyl;
$R^3$ is allyl, methylallyl, dimethylallyl or crotyl; and
$R^4$ is alkyl or up to 5 carbon atoms, or a pharmaceutically acceptable salt thereof.

4. 15-dehydro-6,14-endoetheno-7-(1-hydroxy - 1-methylpentyl)tetrahydrothebaine.

5. 15-dehydro-6,14 - endoetheno - 7 - (1-hydroxy-1-methylhexyl)tetrahydrothebaine.

6. 15-dehydro-6,14-endoetheno - 7 - (1 - hydroxy-1-cyclohexylethyl)tetrahydrothebaine.

7. 15-dehydro-6,14-endoethano - 7-(1-hydroxy-1-cyclohexylethyl)tetrahydrothebaine.

8. 15-dehydro-6,14-endoetheno-7 - (1-hydroxy-1-benzylethyl)tetrahydrothebaine.

References Cited

UNITED STATES PATENTS

| | | | |
|---|---|---|---|
| 3,240,782 | 3/1966 | Brossi et al. | 260—286 |
| 3,285,914 | 11/1966 | Gordon | 260—285 |
| 3,329,682 | 7/1967 | Bentley | 260—285 |

FOREIGN PATENTS

| | | |
|---|---|---|
| 6,700,612 | 7/1967 | Netherlands. |

OTHER REFERENCES

Bentley et. al.: Jour. Am. Chem. Soc., vol. 89, pp. 3267–73 (1967).

Bentley et. al.: Jour. Am. Chem. Soc., vol. 89, pp. 3273–80 (1967).

Bentley et. al.: Jour. Am. Chem. Soc., vol. 89, pp. 3281–92 (1967).

Bentley et. al.: Jour. Am. Chem. Soc., vol. 89, pp. 3293–3303 (1967).

Bentley et. al.: Jour. Am. Chem. Soc., vol. 89, pp. 3303–11 (1967).

Bentley et. al.: Jour. Am. Chem. Soc., vol. 89, pp. 3312–21 (1967).

DONALD G. DAUS, Primary Examiner

U.S. Cl. X.R.

424—260